(12) United States Patent
Weissman et al.

(10) Patent No.: US 10,938,946 B2
(45) Date of Patent: Mar. 2, 2021

(54) HANDSHAKE OF APPLICATION EXECUTION BETWEEN EDGE NODES

(71) Applicant: Amdocs Development Limited, Limassol (CY)

(72) Inventors: Gad Yitzhak Weissman, Hod Hasharon (IL); Nir Fattal, Yehud-Monosson (IL); Shmuel Ur, Shorashim (IL)

(73) Assignee: AMDOCS DEVELOPMENT LIMITED, Limassol (CY)

( * ) Notice: Subject to any disclaimer, the term of this patent is extended or adjusted under 35 U.S.C. 154(b) by 69 days.

(21) Appl. No.: 16/247,185

(22) Filed: Jan. 14, 2019

(65) Prior Publication Data

US 2020/0228623 A1 Jul. 16, 2020

(51) Int. Cl.
*H04L 29/06* (2006.01)
*H04L 12/911* (2013.01)
*H04L 29/08* (2006.01)

(52) U.S. Cl.
CPC .............. *H04L 67/32* (2013.01); *H04L 47/70* (2013.01); *H04L 67/10* (2013.01)

(58) Field of Classification Search
None
See application file for complete search history.

(56) References Cited

U.S. PATENT DOCUMENTS

| 9,986,043 | B2* | 5/2018 | Baltar | H04L 67/148 |
| 10,361,843 | B1* | 7/2019 | Suthar | G06Q 20/401 |
| 2016/0094644 | A1* | 3/2016 | Elias | H04L 67/1034 709/201 |
| 2017/0064009 | A1* | 3/2017 | Baltar | H04L 41/0853 |
| 2017/0295246 | A1* | 10/2017 | Georgiou | H04L 67/148 |
| 2018/0341520 | A1* | 11/2018 | Zhu | H04L 67/1014 |
| 2019/0253274 | A1* | 8/2019 | Van Dussen | H04L 43/12 |
| 2020/0089526 | A1* | 3/2020 | Enguehard | G06F 9/45558 |
| 2020/0104161 | A1* | 4/2020 | Kapur | G06F 11/0712 |
| 2020/0110625 | A1* | 4/2020 | Warnicke | H04L 67/42 |

* cited by examiner

*Primary Examiner* — Joshua Joo
(74) *Attorney, Agent, or Firm* — Zilka-Kotab, P.C.

(57) ABSTRACT

Systems and methods transfer execution of tasks executed on behalf of client devices between edge nodes operated by different operators. A request is received at a destination edge node deployed at a network edge to provide computing services to a client device currently served by an origin edge node. The origina edge node and the destination edge node are operated by different operators. An edge identifier of the origin edge node and task identifier(s) of task(s) executed by the origin edge node for the client device are received. The origin edge node is communicated with to obtain task information relating to the task(s) in one or more registries shared by the first and second operators to map task identifier(s) to respective tasks. A connection is made to the client device the task(s) are executed for the client device using the task information.

20 Claims, 2 Drawing Sheets

HANDSHAKE OF APPLICATION EXECUTION BETWEEN EDGE NODES

BACKGROUND

The present invention, in some embodiments thereof, relates to transferring execution of tasks executed on behalf of client devices between edge nodes during a hand-over of the client devices, and, more specifically, but not exclusively, to transferring execution of tasks executed on behalf of client devices between edge nodes operated by different operators.

The days in which mobile devices were merely used for communication are long past as mobile devices, for example, Smartphones, tablets, computers, smart watches, smart glasses, IoT devices and/or the like are rapidly and constantly evolving into computing platforms serving countless and diverse objectives, uses and applications ranging from sensing application, media consumption through navigation guidance to gaming machines.

The mobile devices connect to the network, specifically to the internet through access points, for example, cellular base stations, wireless access points and/or the like deployed to provide high network coverage.

Edge computing is also a rapidly spreading paradigm such that computation tasks are largely and potentially completely performed by distributed edge nodes deployed at the edge of the network (internet) in close network service proximity to the access points serving the client devices.

SUMMARY

According to a first aspect of the present invention there is provided a computer implemented method of transferring an execution of a task executed on behalf of a client device between edge nodes operated by different operators, comprising using one or more processor of a destination edge node of a plurality of edge nodes deployed at an edge of a network for:

Receiving a request to provide computing services to one or more client devices currently served by an origin edge node of the plurality of edge nodes. The origin edge node is operated by a first operator and the destination edge node is operated by a second operator.

Receiving an edge identifier of the origin edge node and a task identifier of one or more tasks currently executed by the origin edge node for the one or more client devices.

Communicating with the origin edge node identified by the edge identifier to obtain task information relating to one or more of the tasks identified by the task identifier in one or more registries shared by the first and second operators to map the task identifier to the one or more tasks.

Connecting to one or more of the client devices.

Executing the one or more task for one or more of the client devices using the received task information.

According to a second aspect of the present invention there is provided a system for transferring an execution of a task executed on behalf of a client device between edge nodes operated by different operators, comprising a storage storing a code and one or more processors of a destination edge node of a plurality of edge nodes deployed at an edge of a network. One or more of the processors are coupled to the storage for executing the stored code, the code comprising:

Code instructions to receive a request to provide computing services to one or more client devices currently served by an origin edge node of the plurality of edge nodes. The origin edge node is operated by a first operator and the destination edge node is operated by a second operator.

Code instructions to an edge identifier of the origin edge node and a task identifier of one or more tasks currently executed by the origin edge node for the one or more client devices.

Code instructions to communicate with the origin edge node identified by the edge identifier to obtain task information relating to one or more of the tasks identified by the task identifier in one or more registries shared by the first and second operators to map the task identifier to the one or more tasks.

Code instructions to connect to one or more of the client devices.

Code instructions to execute the one or more task for one or more of the client devices using the received task information.

Executing task(s) for the client devices at the edge nodes may significantly reduce the computing resources required by the client device for task execution since at least part of the execution is offloaded to the edge nodes. This may be of particular benefit for supporting low end and limited resources client devices in executing computation intensive application and moreover in executing multiple computation intensive applications. Moreover, transferring task execution between edge nodes operated by different operators may further increase applicability of the execution transfer since it is highly common for edge nodes operated by different operators to have overlapping and/or adjacent network coverage areas thus significantly increasing the amount of edge nodes available for providing computing services to the client devices. Deploying the shared registry(s) may establish a common identification system for edge nodes operated by different operators to identify each other (i.e. the network address) as well as to identify tasks executed by the edge nodes operated by the different operators.

In a further implementation form of the first and/or second aspects, the edge identifier is received from one or more of the client devices relaying the edge identifier from the origin edge node to the destination edge node. In a most naïve implementation the client device relays the edge identifier of the origin edge node to the destination edge node.

In an optional implementation form of the first and/or second aspects, the edge identifier includes a network address of the origin edge node. The network address is used to communicate with the origin edge node. Providing the network address of the origin edge node to the destinations edge node within the edge identifier may allow the destination edge to rapidly establish a communication session with the origin edge node.

In a further implementation form of the first and/or second aspects, the edge identifier is received from one or more central controllers mapping real-time service of the origin edge node to the one or more client devices. Maintaining central controller(s) shared by the different operators may allow mutual identification of the edge nodes operated by the different operators.

In a further implementation form of the first and/or second aspects, the edge identifier is used to obtain a network address of the origin edge node from one or more of the shared registries mapping the edge identifier to the network address of the origin edge node. The network address is used to communicate with the origin edge node. Maintaining registry(s) shared by the different operators may allow edge nodes operated by the different operators to obtain the network addresses of each other in order to establish a communication session with each other.

In a further implementation form of the first and/or second aspects, an operator identifier of the first operator is received. The operator identifier is used to obtain a network address of the origin edge node from the one or more shared registries. The central controller(s) and/or the shared registry(s) may arrange unified record of the edge identifiers and/or the task identifiers based on operators identifiers. Therefore using the operator identifier may significantly increase efficiency for traversing the central controller(s) and/or the shared registry(s) in order to locate and retrieve the edge identifier and/or the network address of the edge nodes.

In a further implementation form of the first and/or second aspects, the task information is applied to transfer the entire one or more tasks from the origin edge node to the destination edge node. In a most naïve implementation the entire task(s) is transferred from the origin edge node to the destination edge node.

In a further implementation form of the first and/or second aspects, the task information is applied to transfer state information of one or more of the tasks from the origin edge node to the destination edge node. The state information is used to execute one or more of the tasks obtained from one or more storage resources. The storage resource(s) are identified in one or more of the shared registries according to the task identifier. Transferring only the state information may significantly reduce the volume of task information transferred from the origin edge node to the destination edge node and may therefore reduce the handshake time to significantly expedite transfer of computing services. Moreover, this may allow the destination edge node to prepare the task(s) in advance (i.e. prior to the execution transfer) after downloaded from another network resource(s) if needed. Once the execution transfer is complete the prepared task(s) may be simply initialized using the state information to resume the task execution from the point it was left off at the origin edge node.

In a further implementation form of the first and/or second aspects, each of the one or more storage resources is a member of a group consisting of: a local storage resource of the destination edge node and/or a remote network resource accessible over the network. Retrieving the task(s) from local storage at the destination edge node may significantly expedite the computation services transfer from the origin edge node to the destination edge node since loading data from the local storage may be extremely fast compared to obtaining data (task(s)) from remote network resource(s). However, in case the task(s) are not readily available in the local storage the destination edge node may access remote network resource(s) to obtain the task(s).

In an optional implementation form of the first and/or second aspects, one or more of the shared registries are accessible by one or more vendors of the one or more tasks. This may allow dynamic and continuous update of the tasks to maintain the task(s) up to date with respect to, for example, a version, feature(s), a network resource from which each task may be obtained (downloaded) and/or the like.

In a further implementation form of the first and/or second aspects, the task information further comprising a client identifier of the one or more client devices used to correctly associate execution of the one or more tasks with the one or more client devices. A single origin edge node may provide computing services to multiple client devices thus it may execute the same task(s) for several client devices. Identifying the client device(s) specifically with respect to the task(s) executed on its behalf by the origin edge node may therefore allow the destination edge node to associate the task(s) with the respective client device(s).

In an optional implementation form of the first and/or second aspects, an authentication certificate of the destination edge node is provided to the origin edge which may validate the authentication certificate to verify the destination edge node is secure. This may allow the origin edge node to authenticate the destination edge node prior to the transfer of execution thus preventing the client device from connecting to an unsecure and/or untrusted destination edge node.

In an optional implementation form of the first and/or second aspects, one or more of the client devices query the destination edge node for its resource availability for execution of the one or more tasks before disconnecting from the origin edge node and connecting to the destination edge node. The resource availability comprising one or more of: availability of software program code required for executing the one or more tasks, computing resources availability, storage resources availability, network resources availability and/or computing services cost. Evaluating resources availability at the destination edge node may allow the client device to assess whether there are sufficient available resources at the destination edge node. The client device may thus decide whether to proceed with the execution transfer based on that assessment.

In an optional implementation form of the first and/or second aspects, one or more of the client devices query the destination edge node for a cost of one or more of its resources allocated for the execution of the one or more tasks before disconnecting from the origin edge node and connecting to the destination edge node. Based on the cost of the resources offered by the destination edge node to be allocated for executing the tasks for the client device, the client device may assess whether it is economically beneficial to transfer the execution to the destination edge node and may proceed with the execution transfer based on that assessment.

In an optional implementation form of the first and/or second aspects, one or more of the client devices identify a plurality of candidates for the destination edge node, the one or more client devices queries one or more randomly selected candidates of the plurality of candidates for its resource availability and initiates connection to the one or more randomly selected candidates according to its resource availability. Selecting the preferred destination edge node based on its resources availability compared to other randomly selected candidate edge nodes may serve to ensure that sufficient resources are available at the preferred destination edge node for executing the task(s) after the execution of the task(s) is transferred to the destination edge node. Randomly selecting the candidate edge nodes may relief the client device from communicating with all candidate edge nodes identified by the client device. This may significantly reduce the communication time required to communicated with a potentially large number of edge nodes and may further reduce computation time required by the client device to explore and assess the resource availability in each of the potentially large number of edge nodes.

In an optional implementation form of the first and/or second aspects, in case one or more of the client devices identify a plurality of candidates for the destination edge node. The respective client device queries each of the plurality of candidates for its respective resource availability and initiates connection to a preferred one of the plurality of candidates selected according to the respective resource availability. Selecting the preferred destination edge node from all identified candidate edge nodes based on its resources availability may allow the client device to select a preferred destination edge node best suitable to serve as the destination edge node for executing the task(s) for the client device.

In an optional implementation form of the first and/or second aspects, the connection of one or more of the client devices to the destination edge node is predicted prior to receiving the request and loading the one or more tasks for execution before one or more of the client devices connect to the destination edge node. Predicting the candidate destination edge node(s) may allow informing these predicted candidate edge node (s) to obtain the task(s) and/or data relating to the task(s) in advance. Therefore, in case the client device(s) requests computing services from one of the predicted candidate edge node(s), the respective predicted candidate edge node already having the task(s) locally available may rapidly, seamlessly and smoothly resume the execution of the task(s).

In an optional implementation form of the first and/or second aspects, a request is issued to the origin edge node to indicate one or more contractual terms relating to the execution of the one or more tasks. Transferring the contractual terms from the origin edge node to the destination edge node may allow the destination edge node to verify whether the client device is entitled for the computing services, at what cost, to what extent (i.e. amount of allocated resource(s)) and/or the like.

In an optional implementation form of the first and/or second aspects, a portion of the execution of the one or more tasks conducted by the destination edge node is measured. Measuring, recording and tracking the resources allocated for executing the task(s) for the client device(s) at the edge nodes may provide means for accurately charging the client device(s)' users according to the respective allocated resources as well as means for accurately and efficiently measuring reward and/or compensation for the operators of the edge nodes according to the respective allocated resources.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION

Figure 1:
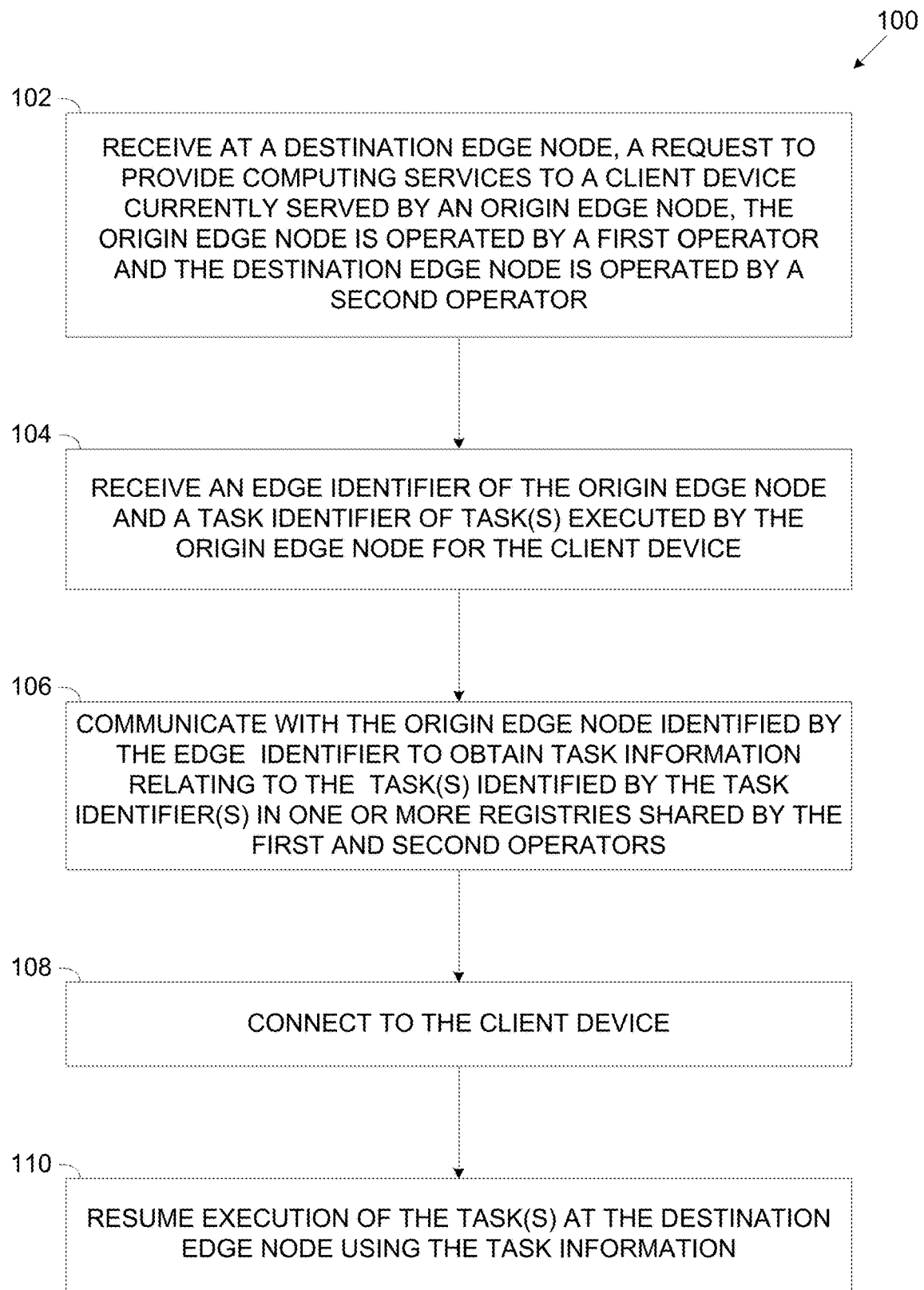
FIG. 1 is a flowchart of an exemplary process of transferring execution of task(s) executed by an origin edge node on behalf of a client device to a destination edge node operated by a different operator than the operator of the origin edge node, according to some embodiments of the present invention.

The present invention, in some embodiments thereof, relates to transferring execution of tasks executed on behalf of client devices between edge nodes during, and, more specifically, but not exclusively, to transferring execution of tasks executed on behalf of client devices between edge nodes operated by different operators.

According to some embodiments of the present invention, there are provided methods, systems and computer program products for transferring execution of tasks executed by the edge nodes for (on behalf of) one or more client devices between edge nodes, in particular between edge nodes operated by different operators. The edge nodes deployed at an edge of a network, in particular the internet, are located in close network proximity to access points, for example, cellular base stations, wireless network access points, routers, switches, and/or the like which provide network connectivity to the client devices, for example, Smartphones, tablets, computers, smart watches, smart glasses, IoT devices and/or the like for connecting to the network. Optionally, one or more of the edge nodes integrate an access device such that the edge node itself provides network connectivity to one or more of the client devices.

The edge node(s) while wirelessly connected to one or more of the client devices may be used for executing one or more tasks, for example, an application, a calculation, a computation, a data manipulation, a data transfer (streaming) and/or the like for (on behalf) the client device(s) thus offloading processing, calculation and/or computation effort from the client device(s) to the edge node(s). This may significantly reduce the computing resources required at the client devices, for example, processing resources (processing power, processing time, etc.), storage resources (e.g. storage capacity), communication resources (e.g. bandwidth) and/or the like.

The client devices which are typically mobile devices may move between geographical areas covered by respective edge nodes having respective network coverage areas. Therefore while a mobile device is located in the network coverage area of a first (origin) edge node, the origin edge node may provide the client device computing services and may execute one or more tasks for the client device. When the client device travels out of the coverage area of the origin edge node and into a coverage area of a second (destination) edge node it may be highly desirable and efficient to transfer the execution of the task(s) to the destination edge node. Therefore, when entering the coverage area of the destination edge node, the client device may issue a computing services request to the destination edge node requesting to transfer execution of the tasks from the origin edge node.

The client device may optionally issue one or more computing services requests under additional conditions and/or circumstances. For example, assuming the origin edge node currently providing computing services to the client device indicates having low and/or insufficient computing resources for serving the client device. Further assuming the client device identifies a presence of a second (destination) edge node which may potentially provide the computing services. In such case the client device may issue a computing services request to the destination edge node.

In order to transfer the execution of the tasks executed by the origin edge node for the client device, the destination edge node needs to identify this task(s) and initiate it in order to seamlessly, efficiently and smoothly resume task execution currently conducted by the origin edge node. Seamlessly transferring the task execution may significantly improve the execution at the client device and may significantly improve the user experience of a user using the client device.

In order to establish a communication session with the origin edge node and initiate execution of the task(s), the destination edge node may receive an edge identifier uniquely associated with the origin edge node and one or more task identifiers of one or more tasks executed by the origin edge node for the (requesting) client device. The edge identifier and/or the task identifier(s) may be received from the client device relaying the data from the origin edge node to the destination edge node.

In scenarios where the origin edge node and the destination edge node are operated by different operators the edge nodes may be part of different nets or chains of computing nodes which are operated by different operators. As such, the edge nodes of one operator may not be able to directly identify and communicate with edge nodes of another operator. To overcome this, multiple operators may share one or more shared registries, for example, a server, a computing node, a cloud service and/or the like which map edge identifiers uniquely associated with each of the edge nodes of the different operators with their respective network addresses, for example, an Internet Protocol (IP) address, a Media Access Controller (MAC) address and/or the like. Using the received edge identifier of the origin edge node, the destination edge node may access (communicate) with one or more of the shared registries to obtain the network address of the origin edge node.

Optionally, one or more central controllers, for example, a server, a computing node, a cloud service and/or the like maintain a real-time service which maps a plurality of client devices to the respective edge nodes currently providing computing services to the client devices. Using the identifier of the client device (which may be received as part of the computing services request), the destination edge node may access the central controller(s) to identify the origin edge node currently servicing the requesting client device. After the origin edge node is identified, the destination edge node may further obtain the network address of the origin edge node from the shared registry(s).

Optionally, one or more of the shared registries is integrated with one or more of the central controllers such that the functionality of the central controller(s) is provided by the shared registry(s).

Optionally, the destination edge node receives the edge identifier and optionally the task identifier(s) from one or more of the central controllers which monitor in real-time the computing services provided by edge nodes to client devices and may proactively transmit the edge identifier to the destination edge node.

Since the origin edge node and the destination edge node are operated by different operators, the destination edge node may not be familiar and/or synchronized with the task identifiers used by the origin edge node. To overcome this, one or more of the shared registries may maintain a unified record, for example, a list, a table, a database and/or the like which maps task identifiers to their respective tasks thus establishing a common identification system for the tasks between the different operators. The destination edge node may therefore access one or more of the shared registries and use the received task identifier(s) to identify the respective task(s) executed by the origin edge node for the client device. Moreover, the shared registry(s) may map one or more of the tasks to one or more network resources from which the respective task may be obtained (downloaded).

Using the network address of the origin edge node, the destination edge node may communicate with the origin edge node to receive task information relating to the task(s) identified by the task identifier(s) and executed by the origin edge node for the client device. The task information transmitted from the origin edge node to the destination edge node may include the entire task and may further include state information. For example, in case a certain task executed by the origin edge node for the client device comprises data transfer, for example, a video streaming of a certain video stream from the network to the client device, the task information may include the video stream and/or part thereof available at the origin edge node. In another example, in case the task comprises executing computations for a gaming application executed by the client device, the task information may include the game application available at the origin edge node.

Moreover, in order to support seamless and smooth continuation of the task(s) execution when the execution is resumed at the destination edge node, the task information received from the origin edge node includes state information comprising state and/or status of the task(s). For example, in case of the video streaming task, the state information may include, for example, an indication of a latest frame of the video stream transmitted to the client device. In another example, in case of the gaming application task, the state information may include, for example, a difficulty level of the game, a current level of the game reached by the associated user, a current score, a history of achievements, a current count of remaining lives, an indication of currently available bonuses and/or prizes and/or the like.

Optionally, the task information received by the destination edge node from the origin edge node includes only the state information relating to the task(s) executed by the origin edge node for the client device. In such case the destination edge node may obtain, receive and/or retrieve the task(s) from one or more local resources and/or remote network resources. For example, it is possible that a popular application in use by a plurality of client devices may be locally stored at the destination edge node and may be initiated for the handed-over client device using the state information received from the origin edge node. In another example, the destination edge node may communicate and access one or more remote network resources indicated in the shared registry(s) for a certain task to obtain the certain task and initiate it using the state information received from the origin edge node.

Optionally the client device queries the destination edge node for its availability of resources for providing the computing services to the client device, i.e. for executing the task(s) for the client device. These resources may include, for example, computing resources (e.g. processing power, processing time), storage resources (e.g. storage capacity), communication resources (e.g. bandwidth, latency) and/or the like.

Moreover, the client device may query the destination edge node for a cost of one or more of the resources allocated for executing the task(s) for the client device. The cost charged by the operator of the edge node for allocating the resources for processing the task(s) for the client device may be defined per task unit, per time unit, per resource unit and/or the like.

Optionally, in case the client device detects a plurality of edge nodes that are candidates for serving as the destination edge node, the client device selects a preferred candidate edge node according to the availability of resources of the candidate edge nodes for executing the task(s). For example, the client device may select the preferred candidate edge node by comparing the resource availability of all the identified candidate edge nodes. In another example, the client device may select the preferred candidate edge node by comparing the resource availability of a subset of the candidate edge nodes, for example, a subset of randomly selected candidate edge nodes. Moreover, the client device may select the preferred candidate edge node based on the cost reported by each of the candidate edge nodes for allocating the resource(s) to execute the task(s) for the client device.

Optionally, one or more of the edge nodes are predicted in advance as candidates for serving as the destination edge node, i.e. prior to the client device issuing the connection request to one or more of the candidate edge nodes. One or more of the predicted candidate edge nodes may be identified based on a travel path identified for the client device. For example, assuming a certain client device is associated, mounted and/or carried by a moving vehicle. Based on the identified path of the vehicle, one or more future paths may be estimated for the vehicle. Moreover, one or more candidate cellular base stations (edge nodes) may be identified along the estimated path(s). The predicted candidate(s) may download one or more of the task(s) executed for the client device by an edge node currently serving the client device.

Optionally, one or more of the edge nodes executing task(s) for (on behalf) the client device(s) measure and record the resources allocated for executing the task(s). The portion of execution of the task(s) conducted by each of the edge nodes for each of the client device(s) may be efficiently tracked.

Executing task(s) for the client devices at the edge nodes and transferring the task execution, in particular transferring the task execution between edge nodes operated by different operators may present significant advantages and benefits. First, executing the task(s) for (on behalf) the client devices may significantly reduce the computing resources required by the client device for task execution. This may allow the client devices which may have limited computing resources to process computation intensive applications since at least part of the execution is offloaded to the edge nodes which are constantly becoming more powerful and resources rich. This may be of particular benefit for supporting low end and limited resources client devices in executing computation intensive application and moreover in executing multiple computation intensive applications.

The advantage of transferring task execution between edge nodes may be dramatically intensified by transferring the execution between edge nodes operated by different operators since it may be highly common for edge nodes operated by different operators to have overlapping and/or adjacent network coverage areas thus significantly increasing the amount of edge nodes available for providing computing services to the client devices. Deploying the shared registry(s) may establish a common identification system for edge nodes operated by different to identify each other (i.e. the network address) as well as to identify tasks executed by the edge nodes operated by the different operators. Since different operators typically maintain independent and separate such identification systems providing the common identification system may be essential to provide efficient and robust means for the edge nodes to identify each other and establish communication sessions with each other. This may also apply to the task identifiers which may differ between the different operators and are thus unified in the shared registry(s) such that each edge node may identify the task(s) executed by other edge nodes even if operated by a different operator.

Moreover, transferring only the state information may significantly reduce the volume of task information transferred from the origin edge node to the destination edge node and may therefore reduce the handshake time to significantly expedite transfer of computing services. Expediting the transfer of computing services and rapidly resuming execution of the task(s) at the same point (state, phase) after the transfer of computing services is complete may reduce and possibly completely prevent impact on the task execution and may therefore significantly improve user experience of the user using the client device. Transferring only the state information requires the destination edge node to identify and obtain the task from the network resource(s). This is made feasible for edge nodes operated by different operators by deploying the shared registry(s) to establish the common identification system for identifying the tasks.

Furthermore, predicting the candidate destination edge node(s) may allow the predicted candidate edge node(s) to obtain the task(s) and/or data relating to the task(s) in advance. Therefore, in case the client device requests computing services from one of the predicted candidate edge node(s), the respective predicted candidate edge node already having the task(s) locally available may rapidly, seamlessly and smoothly resume the execution of the task(s) thus presenting minimal and potentially no impact on the task execution and further improve the user experience of the user sing the client device.

In addition, selecting the preferred destination edge node from the plurality of candidate edge node(s) according to their resources availability may serve to ensure that sufficient resources are available at the preferred destination edge node for executing the task(s) after the execution of the task(s) is transferred to the destination edge node.

Finally, measuring, recording and tracking the resources allocated for executing the task(s) for the client device(s) at one or more of the edge nodes executing task(s) may be highly valuable for accurate charging of the client device(s)' users according to the respective allocated resources. Moreover, tracking the portions of execution of the task(s) conducted by each of the edge nodes for each of the client device(s) may allow for accurate and efficient reward and compensation of the operators of the edge nodes according to the respective allocated resources.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable storage medium can be a tangible device that can retain and store instructions for use by an instruction execution device. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer Program code comprising computer readable program instructions embodied on a computer readable medium may be transmitted using any appropriate medium, including but not limited to wireless, wire line, optical fiber cable, RF, etc., or any suitable combination of the foregoing.

The program code for carrying out operations for aspects of the present invention may be written in any combination of one or more programming languages, including an object oriented programming language such as Java, Smalltalk, C++ or the like and conventional procedural programming languages, such as the "C" programming language or similar programming languages.

The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). The program code can be downloaded to respective computing/processing devices from a computer readable storage medium or to an external computer or external storage device via a network, for example, the Internet, a local area network, a wide area network and/or a wireless network.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to the drawings, FIG. 1 illustrates a flowchart of an exemplary process of transferring execution of task(s) executed by an origin edge node on behalf of a client device to a destination edge node operated by a different operator than the operator of the origin edge node, according to some embodiments of the present invention. An exemplary process 100 may be executed by a destination edge node deployed at an edge of a network which is requested to execute one or more tasks currently executed for one or more client devices by an origin edge node where the origin edge node and the destination edge node are operated by different operators (e.g. service providers, etc.).

The origin edge node currently serving the client device(s) may execute one or more tasks (workloads) for (on behalf of) the client device(s), for example, an application, a calculation, a computation, a data manipulation, a data transfer (streaming) and/or the like. Such scenarios may be applied for supporting task execution for the client device(s) in order to reduce computation load at the client device(s).

Due to one or more conditions, one or more of the client devices may request the destination node for computing services in order to execute one or more of the task(s) currently executed by the origin edge node, i.e. to transfer execution of the task(s). Such conditions may include for example, the client device(s) travelling out of a coverage area of the origin edge node and into the coverage area of the destination edge node, lack of computing resources at the origin edge node for executing the task(s) for the client device(s), a hand-over of the client device(s) from the origin edge node serving network connectivity for the client device to the destination edge node and/or the like.

In order to transfer the execution of the task(s), the destination edge node needs to identify the task(s) executed by the origin edge node for (on behalf) the client device(s). To seamlessly, smoothly and efficiently transfer the execution of the tasks, the destination edge node may communicate with the origin edge node to obtain task information which in addition to identifying the executed task(s) may further include status and/or state of the executed task(s).

However, while the destination node may receive an edge identifier of the origin node from the requesting mobile device(s), since the origin edge node and the destination edge node are operated by different operators, the destination node may be unable to properly identify the origin edge node, specifically a network address of the origin edge node and may thus fail to communicate with the origin edge node.

To overcome this, the destination edge node may access one or more shared registries which are shared by the operators of both the origin edge node and the destination edge node. The shared registry(s) may hold a unified record, for example, a list, a table, a database which maps the identifiers of edge nodes to their network addresses. The destination edge node may therefore access the shared registry(s) to retrieve the network address of the origin edge node and establish a communication session with the origin edge node.

Moreover, due to the fact that the destination edge node and the origin edge node are operated by different operators, the destination edge node may not be familiar and/or synchronized with the task identifiers used by the origin edge node. The destination edge node may therefore access one or more of the shared registries and use the task identifier(s) received from the client device to identify the respective task(s) executed by the origin edge node for the client device.

Using the task information, the destination edge node may resume the execution of the task(s) after connecting to the client device from the point and/or state of the task(s) previously executed by the origin edge node.

Figure 2:
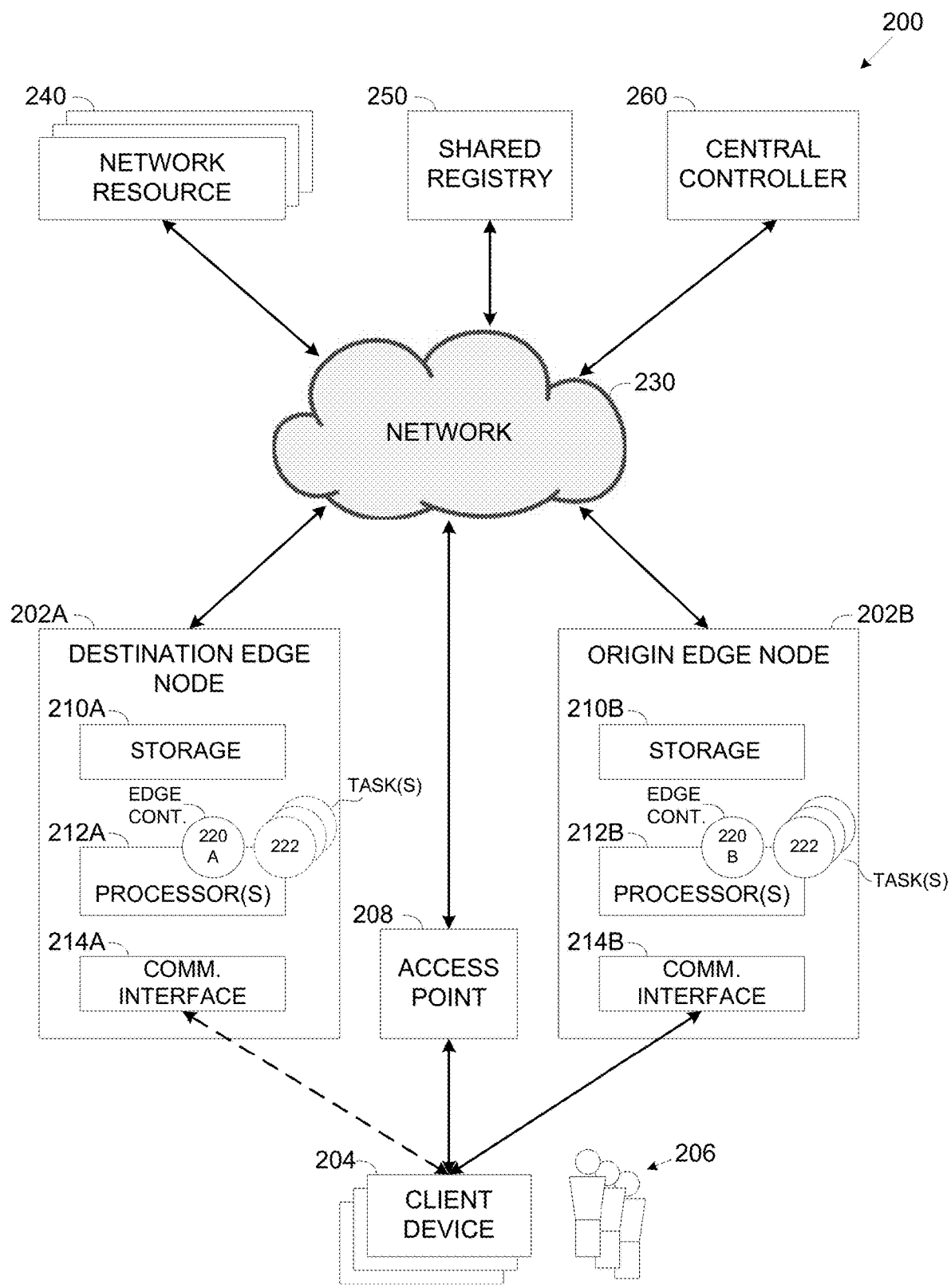
FIG. 2 is a schematic illustration of an exemplary system for transferring execution of task(s) executed by an origin edge node on behalf of a client device to a destination edge node operated by a different operator than the operator of the origin edge node, according to some embodiments of the present invention.

FIG. 2 is a schematic illustration of exemplary system for transferring execution of task(s) executed by an origin edge node on behalf of a client device to a destination edge operated by a different operator than the operator of the origin edge node, according to some embodiments of the present invention. An exemplary system 200 may include one or more client devices 204, for example, a Smartphone, a tablet, a laptop, a desktop, a smart watch, smart glasses and/or the like which may be associated with respective users 206. The client device may further include one or more other user equipment (UE) devices which are not directly associated with a specific user, for example, a vehicular device mounted, attached, installed and/or carried by vehicles (e.g. car, bus, tram, train, etc.) for controlling one or more functions, actions and/or features of the vehicle.

A plurality of edge nodes 202, for example, a server, a processing node, a network node and/or the like may be deployed at an edge of a network 230 in close network proximity to one or more access points 208, for example, a cellular base station, a router, a switch, and/or the like deployed to provide the client devices 204 network connectivity to a network 230. The network 230 may comprise one or more wired and/or wireless networks, for example, a Local area Network (LAN), a Wireless LAN (WLAN), a Wide Area Network (WAN), a Municipal Area Network (MAN), a cellular network, the internet and/or the like may typically constitute a core (backbone) of the network, specifically the internet.

The plurality of edge nodes 202 may be operated by different operators (e.g. service providers, etc.) which may each maintain a separate net or chain of edge nodes 202. Therefore, while all the edge nodes 202 may be connected to the network 230, edge nodes 202 associated with different operators may be unable to inherently identify each other as they are deployed in different nets or chains. In particular, edge nodes 202 operated by different operators may be unable to obtain each other's' network addresses, for example, an IP address, a MAC address and/or the like and may thus be unable to communicate with each other.

Deployed at the edge of the network 230 and in close network proximity to the client device(s) 204, one or more of the edge nodes 202 may provide computing services to one or more of the client devices 204. The edge nodes 202 may have significant computing resources, for example, processing resources, storage resources, network resources and/or the like which may be allocated for executing at least partially one or more tasks for (on behalf of) the client device(s) 204.

Optionally, one or more of the edge nodes 202 may facilitate (integrate) the access point 208 such that the edge nodes 202 provide network connectivity to one or more of the client devices 202 for connecting to the network 230.

Each of the edge nodes 202 may include a communication interface 210 comprising one or more wired and/or wireless network interfaces for connecting to the network 230, a processor(s) 212 for executing a process such as the process 100 and storage 214 for storing program code (program store) and/or data. The communication interface 210 may further include one or more wireless network interfaces, for example, a WLAN (e.g. Wi-Fi) interface, a cellular interface and/or the like for communicating with one or more of the client devices 202.

The processor(s) 212, homogenous or heterogeneous, may include one or more processing nodes arranged for parallel processing, as clusters and/or as one or more multi core processor(s). The storage 214 may include one or more non-transitory memory devices, either persistent non-volatile devices, for example, a ROM, a Flash array, a hard drive, an SSD, a magnetic disk and/or the like and/or one or more volatile devices, for example, a RAM device, a cache memory and/or the like. The storage 214 may further comprise one or more network storage resources, for example, a storage server, a network accessible storage (NAS), a network drive, a cloud storage and/or the like accessible via the communication interface 210.

The processor(s) 212 of one or more of the edge nodes 202 may execute one or more software modules such as, for example, a process, a script, an application, an agent, a utility, a tool and/or the like each comprising a plurality of program instructions stored in a non-transitory medium (program store) such as the storage 214 and executed by one or more processors such as the processor(s) 212. For example, the processor(s) 212 may execute an edge controller 220 for executing the process 100. The edge controller 220 may control communication with the client device(s) 204 and/or with other edge node(s) 202. The edge controller 220 may further execute and/or control execution of one or more tasks 222, for example, an application, a calculation, a computation, a data manipulation, a data transfer (streaming) and/or the like executed by the processor(s) 212 for (on behalf) one or more of the client devices 204 currently provided with computing services from the edge node 202. Each task 222 constitutes at least part of a respective task executed by the client device 204.

Executing the task(s) 222 for the client device 204 at the edge node 202 may significantly reduce the computing resources required by the client device 204 for task(s) execution, for example, processing power, processing time, storage resources (e.g. storage capacity), communication resources (e.g. bandwidth) and/or the like. The task(s) 222 executed by the edge node 202 may allow producing more advanced and mature end products which may be transmitted to the client device 204. The client device 204 may therefore conduct less computation which may significantly reduce the processing resources and/or the storage resources required at the client device 204. Moreover, the more advanced and/or mature end products transmitted to the client device(s) 204 typically comprise less data thus further reducing the communication resources and/or the storage resources required at the client device 204. Therefore, executing the task(s) 222 at the edge node 202 may be of particular benefit for supporting low end client devices 204 typically having limited computing resources.

Via the network 230, the edge controller 220 may communicate with one or more network resources 240, for example, a server, a processing node, a network node, a cloud service, a cloud platform, a storage server, a cloud storage and/or the like for obtaining (e.g. receiving, fetching, etc.) task data relating to the one or more of the tasks 222 executed by another edge node(s) for one or more of the client devices 204. The network resources 240 may include, for example, storage resources for storing one or more tasks 222 which may be downloaded by the edge controller 220 of one or more of the edge nodes 202. In another example, one or more of the network resources 240 may be associated with one or more of the operators (service providers, etc.) for providing contractual information for one or more of the client devices 204.

The edge controller 220 may communicate with one or more shared registries 250, for example, a server, a processing node, a network node, a cloud service, a cloud platform and/or the like shared by one or more operators. The shared registry(s) 250 may maintain one or more unified records, for example, a list, a table, a database and/or the like which map edge identifiers uniquely associated with respective edge nodes 202 to network addresses of the respective edge nodes 202, for example, an IP address, a MAC address and/or the like. The unified record(s) maintained by the shared registry(s) 250 is shared by the different operators such that it maps edge nodes 202 operated by the different operators.

Moreover, one or more of the shared registries 250 may map the tasks 222 for identification and service. The shared registry(s) 250 may map task identifiers uniquely associated with respective tasks 222 to identify the task 222. The shared registry(s) 250 may further map the plurality of tasks 222 to respective network resources 240, typically network storage resources from which the tasks 222 may be downloaded. As such the shared registry(s) 250 may map each task identifier with a respective task name and a respective network resource(s) 240 from which the task(s) 222 may be downloaded. For example, a certain application named "waroftheworld.version.1.2.3.4444567" may be assigned with a unique task identifier, for example, #12456 and an indication of respective network resource(s) 240 from which the certain application may be downloaded, for example, "www(dot)app(dot)com/waroftheworld". As the shared registry(s) 250 are shared by multiple different operators the shared registry(s) 250 thus set a common identification system for identifying the tasks 222 to edge nodes 202 operated by the different operators. As such edge nodes 202 operated by different operators may correctly identify the tasks 222 to each other when communicating with each other.

The shared registry(s) 250 may be accessible to one or more vendors of one or more of the tasks 222, for example, a task vendor, a service provider, a product owner, an application developer and/or the like. For example, the vendors may access one or more of the shared registries 250 to update the network resources 240 from where the tasks may be obtained (downloaded). In another example, one or more of the vendors may access the shared registry(s) 250 to update a version of one or more of the tasks 222.

The edge controller 220 may further communicate with one or more central controllers 260 which maintain a real-time service map identifying which of the plurality of edge nodes 202 serves which of the plurality of client devices 204. In particular, one or more of the central controllers 260 may be shared by multiple operators to allow inter-operation between edge nodes 202 operated by different operators. The central controller(s) 260 may further map network coverage areas to their respective edge nodes 202 such that a client device 204 located in a certain coverage area may be identified as being connected and provided with computing services by an edge node 202 associated with the certain coverage area.

An exemplary destination edge node 202A (destination edge node) operated by a first operator may include a communication interface 210A such as the communication interface 210, a processor(s) 212A such as the processor(s) 212 for executing an edge controller 220A such as the edge controller 220 and storage 214A such as the storage 214. Similarly, an exemplary origin edge node 202B (origin edge node) operated by a second operator may include a communication interface 210B such as the communication interface 210, a processor(s) 212B such as the processor(s) 212 for executing an edge controller 220B such as the edge controller 220 and storage 214B such as the storage 214.

Moreover, as described herein above, the client device 204 which currently receives computing services from the origin edge node 202B for executing one or more tasks 222 on behalf of the client device 204 may request the destination edge node 202A to provide it with computing services to execute these task(s) 222.

The process 100 and the system 200 are described for the two exemplary edge nodes 202A and 202B and a single client device 204. However, this should not be construed as limiting since the process 100 and the system 200 may be expanded to a serve a plurality of client devices 204 requesting to transfer computing service between the edge nodes 202A and 202B as well as to a plurality of additional edge nodes 202.

As shown at 102, the process 100 starts with the destination edge controller 220A receiving a request to provide computing services to a certain client device 204. The client device 204 may be currently served (i.e. provided with computing services) by another edge node 202, specifically the origin edge node 202B. The computing services request issued by the client device 204 to the edge controller 220A executed by the destination edge node 202A is directed to initiate a transfer of execution of one or more tasks 222 which are currently executed on behalf of the client device 204 by the origin edge node 202B to be executed by the destination edge node 202A.

The computing services provided by the edge controller 220B may include controlling, initiating and/or executing one or more of the tasks (workloads) 222 for (on behalf) the client device 204. For example, the user 206 may consume online media such as, for example, a video stream download by the client device 204 in real time from the network 230 via the origin edge node 202B and presented to the user 206. In order to maintain high video quality at least part of the video stream needs to be locally buffered in the origin edge node 202B to prevent video streaming degradation that may result from communication failures and/or limitations in the network 230, for example, high latency, lack of bandwidth and/or the like. Since the origin edge node 202B is located at the edge of the network 230 in close network proximity to the client device 204, the edge controller 220B may locally buffer at least part of the video stream at the origin edge node 202B, for example, in the storage 214B while streaming the video to the client device 204. This may significantly reduce the storage resources required at the client device 204 for buffering the video stream. In another example, the edge controller 220B of the origin edge node 202B may execute at least part of an application executed by the client device 204 to reduce the computation resources required at the client device 204. For example, assuming the client device 204 executes a certain application, for example, a game involving computations which require extensive processing power and/or time, the edge controller 220B may execute at least part of the game computations and provide end products to the client device 204.

The client device 204 may issue such a computing services request under one or more conditions.

For example, the mobile client device 204 may travel between geographical network coverage areas covered by different edge nodes 202. The mobile client devices 204 may include, for example, a vehicular client device mounted in a vehicle, a client device associated with a user 206 and/or the like where the vehicle and/or the user 206 travel between adjacent coverage areas served by different edge nodes 202. For example, assuming the origin edge node 202A and the destination edge node 202B are cellular base stations thus performing as access points 208 to provide network connectivity to a vehicular client device 204. In case the vehicular client device 204 travels from a first coverage area served by the origin cellular base station 202B to a second coverage area served by the destination cellular base station 202A, the vehicular client device 204 may transmit the computing services request to the destination cellular base station 202A. The same may apply to a certain client device 204 associated with a certain user 206 travelling in a vehicle between such coverage areas. In another example, assuming the origin edge node 202A and the destination edge node 202B are wireless (e.g. Wi-Fi) network nodes. A certain user 206 associated with a certain client device 204 may walk around and travel from a first network coverage area served by the origin wireless network node 202B to a second network coverage area served by the destination wireless network node 202A, the certain client device 204 may transmit the computing services request to the destination wireless network node 202A.

In another example, the origin edge node 202B currently providing computing services to the client device 204 may inform the client device 204 that the computing resources of the origin edge node 202B are insufficient for executing one or more of the tasks 222. In such case and assuming that the client device 204 is within the coverage area of the destination edge node 202A, the client device 204 may transmit the computing services request to the destination wireless network node 202A which may have sufficient computing resources for executing the task(s) 222.

Optionally, prior to progressing with transferring the execution of the task(s) 222 from the origin edge node 202B to the destination edge node 202A, the client device 204 queries the destination edge node 202A, specifically the edge controller 220A for availability of resources at the destination edge node 202A for executing the task(s) 222. The client device 204 may issue the query to ensure that the edge node 202A has sufficient resources for executing the task(s) 222, for example, availability of software program code, availability of processing resources (e.g. processing power, processing time, etc.), availability of storage resources (e.g. storage capacity), availability of network resources (e.g. bandwidth, latency, etc.) and/or the like. For example, assuming the task(s) 222 include streaming the certain video stream to the client device 204, the client device may query the destination edge node 202A for the available bandwidth that may be allocated for downloading the certain video stream from the network 230 and streaming it to the client device 204. In another example, assuming the task(s) 222 include conducing rendering tasks for a game application executed by the client device 204, the client device may query the destination edge node 202A for the available computing resources, in particular rendering resources that may be allocated for rendering at least some of the contents of the game application executed by the client device 204.

Moreover, the client device 204 may query the destination edge node 202A for a cost of one or more of the resources that are to be allocated by the destination edge node 202A for executing the task(s) 222 for the client device 204. The cost which is charged by the operator of the destination edge node 202A for allocating the resources for processing the task(s) 222 for the client device may be defined and/or expressed in different forms, for example, per task unit, per time unit, per resource unit and/or the like. To continue the previously presented example of the streaming video task 222, the client device may query the destination edge node 202A for the cost of the network resources, for example, a cost to download a certain data unit (e.g. MB). In the game application rendering example, the client device may query the destination edge node 202A for the cost of the rendering (computing) resources (e.g. a GPU), for example, the cost of a certain rendering time unit (e.g. 1 minute), the cost to render a certain data unit (e.g. MB) and/or the like.

In some scenarios in case the client device identifies that the resources available at the destination edge node 202A are insufficient for executing the tasks(s) 222 and/or the cost of the resources offered by the destination edge node 202A are excessive, the client device 204 may terminate the request for computing services and hence terminate the transfer of execution of the task(s) 222. In such case the client device 204 may remain connected to the origin edge node 202B which may continue executing the task(s) 222 for the client device 204.

Optionally, in case the client device 204 identifies a plurality of candidate edge nodes 202 for serving as the destination edge node 202A, the client device 204 queries one or more candidates randomly selected from the plurality of candidate edge nodes 202 for their resource availability and optionally for the cost of the resources. After receiving the responses from at least some of the randomly selected candidate edge nodes 202, based on the resource availability and optionally the resources cost reported by the candidate edge nodes 202, the client device 204 may select a preferred one of the randomly selected candidate edge nodes 202 to provide the client device 204 with computing services for executing the task(s) 222. For example, assuming the client device 204 processes a rendering task, such as, for example, a 3 dimensions (3D) game for which the origin edge node 202B may be executing one or more rendering intensive tasks 222 to perform the rendering for the client device 204. In such case, the client device 204 may select one of the randomly selected candidate edge nodes 202 which reports having highest available rendering resources, for example, a Graphic Processor Unit (GPU) having significant processing power and/or the like. In another example, assuming the client device 204 requires large data volumes for real-time or near real-time use, the origin edge 202B may be executing one or more network intensive tasks 222 for downloading and buffering the data required for the client device 204. In such case, the client device 204 may select one of the randomly selected candidates which reports having highest network bandwidth, lowest network latency and/or the like. Moreover, in case a certain one of the randomly selected candidates reports of locally storing the data required by the client device 204 and/or part thereof, the client device 204 may select the certain candidate since it may provide the required data from its local storage with no and/or reduced need for accessing the network 230.

Optionally, in particular in case multiple of the randomly selected candidate edge nodes 202 report having sufficient rendering resources, the client device 204 may select the preferred edge node 202 according to the cost reported by at least some of the candidate edge nodes 202 for the resource(s) to be allocated for executing the task(s) 222. For example, the client device 204 may select the preferred edge node 202 reporting a lowest cost for the resource(s) to be allocated for executing the task(s) 222.

Optionally, in case the client device 204 identifies a plurality of candidates for the destination edge node 202A, the client device 204 queries each of the plurality of candidates for their resource availability. After receiving the responses from at least some of the randomly selected candidates and based on the resource availability reported by the candidates, the client device 204 may select a preferred one of the candidates to which the execution of the task(s) may be transferred.

Optionally, in particular in case multiple candidate edge nodes 202 report having sufficient rendering resources, the client device 204 may select the preferred edge node 202 according to the cost reported by at least some of the candidate edge nodes 202 for the resource(s) to be allocated for executing the task(s) 222. For example, the client device 204 may select the preferred edge node 202 reporting a lowest cost for the resource(s) to be allocated for executing the task(s) 222.

As shown at 104, the edge controller 220A may receive an edge identifier of the origin edge node 202B and a task identifier of one or more of the tasks 222 executed by the origin edge node 202B for the client device 204.

The edge controller 220A may receive the edge identifier of the origin edge node 202B from the client 204 relaying the edge identifier of the origin edge node 202B to the edge controller 220A.

Optionally, the edge controller 220A may receive the edge identifier from the central controller(s) 260 which maintains the real-time service map identifying which edge node 202 serves the client device 204 including the connection between the origin edge node 202B and the client device 204 for providing the computing services to the client device 204. The edge controller 220A may therefore communicate with the central controller(s) 260 to obtain the edge identifier of the origin edge node 202B. For example, the edge controller 220A may provide a device identifier of the client device 204 (received from the client device 204) to the central controller(s) 260 to identify which of the edge nodes 202 currently provides computing services to the specific client device 204. In another example, the edge controller 220A may use communicate with the central controller(s) 260 to receive the edge identifier(s) of the origin edge node 202B having a network coverage area overlapping and/or adjacent to the coverage area of the destination edge node 202A.

Since the destination edge node 202A and the origin edge node 202B are operated by the different operators, the network address of one edge node 202 may not be available to the other edge node 202, for example, the IP address, the MAC address and/or the like. As such, the edge controller 220A executed by the destination edge node 202A may not have the network address of the origin edge node 202B.

Optionally, in case the edge identifier is provided by the client device 204, the client device 204 may further includes the network address of the origin edge node 202B in the edge identifier transmitted to the edge controller 220A.

Optionally, in case the edge identifier is received from the central controller(s) 260, the central controller(s) 260 may further include the network address of the origin edge node 202B in the edge identifier transmitted to the edge controller 220A.

However, due to security considerations, the client device 204 may typically not relay the network address of the origin edge node 202B to the edge controller 220A. The edge controller 220A may therefore communicates with one or more of the shared registries 250 which are shared by the operator of the destination edge node 202A and the operator of the origin edge node 202B to obtain the network address of the origin edge node 202B. Since the shared registry(s) 250 map the edge identifiers of at least some of the edge nodes 202 operated by the different operators to their respective network addresses, the shared registry(s) 250 may also map the edge identifier of the origin edge node 202B to its respective network address. The edge controller 220A may therefore access the shared registry(s) 250 and use the edge identifier of the origin edge node 202A received from the client device 204 to retrieve the network address mapped in the shared registry(s) 250 to the origin edge node 202A.

Optionally, the edge controller 220A receives an operator identifier of the first operator operating the origin edge node 202B. The edge controller 220A may use the operator identifier to efficiently traverse the shared registry(s) 250 which may arrange the unified record based on operators identifiers to easily locate the edge identifier of the origin edge node 202B and retrieve its mapped network address. In another example, the edge controller 220A may communicate with the central controller(s) 260 to identify edge nodes 202 operated by the first operator (identified by the operator identifier) that have network coverage area overlapping and/or adjacent to the coverage area of the destination edge node 202A and are hence potentially the origin edge node 202B providing computing services to the client device 204.

Optionally, the edge controller 220A provides an authentication certificate of the destination edge node 202A to the origin edge node 202B, in particular, to the edge controller 220B. The edge controller 220B may validate the received authentication certificate to verify the identity and/or the authenticity of the destination edge node 202A before transferring execution of the task(s) 222 to the destination edge node 202A. The edge controller 220B may access, for example, one or more of the shared registries 250 mapping a plurality of edge nodes 202 to verify the authentication certificate of the destination edge node 202A which was received from the edge controller 220A.

The edge controller 220A may further receive one or more task identifiers of respective task(s) 222 executed by the origin edge node 202B for the client device 204. Each of the tasks 222 may be assigned a unique task identifier which identifies the respective task 222 in order to uniquely identify and map the respective task 222. The edge controller 220A may receive the task identifier(s) from the client 204 relaying the task identifier(s) from the origin edge node 202B. Optionally, the edge controller 220A may directly communicate with the origin edge node 202B, specifically with the edge controller 220B to obtain the task identifier(s) of the task(s) 222 executed by the origin edge node 202B for the client device 204.

Optionally, the edge controller 220A receives an instance ID of one or more of the task(s) 222 to identify the specific instance of the task 222 executed by the origin edge node 202B for the specific client device 204 requesting to transfer the execution of the task(s) 222 to the destination edge node 202A.

As shown at 106, the edge controller 220A may communicate with the origin edge node 202B using the network address of the origin edge node 202B, specifically with the edge controller 220B to receive task information relating to the task(s) 222 executed by the origin edge node 202B for the client device 204.

Since the destination edge node 202A and the origin edge node 202B may be operated by different operators, the edge controller 220A may not be familiar and/or synchronized with the identifier(s) of the task(s) 222 received from the origin edge node 202B. The edge controller 220A may therefore access one or more of the shared registries 250 which are shared by the operators of the destination edge node 202A and the origin edge node 202B to establish the common identification system for identifying the tasks 222 to edge nodes 202 operated by the different operators. Using the task identifier(s) of the task(s) 222 received from the edge controller 220B via the client device 204, the edge controller 220A may retrieve the identity of the task(s) 222 from the shared registry(s) 250.

Coupled with the identity of the task(s) 222, the edge controller 220A may use the task information received from the edge controller 220B, to seamlessly, smoothly and efficiently transfer the execution of the task(s) 222 from the origin edge node 202B to the destination edge node 202A.

The task information that the edge controller 220A receives from the edge controller 220B may comprises the entire task 222 of one or more of the task(s) 222 executed by the origin edge node 202B for the client device 204. For example, assuming a certain task 222 is a certain video stream streamed from the network 230 to the client device 204 via the origin edge node 202B. In such case the task information received from the edge controller 220B may include the entire video stream or at least a portion of the video stream that was already downloaded to the origin edge node 202B for serving the client device 204. In another example, assuming a certain task 222 is a certain game which is at least partially processed by the origin edge node 202B. In such case, the task information received from the edge controller 220B may include the entire game.

The task information may further include state information indicating a state and/or a status of execution of one or more of the task(s) 222. The state information may include, for example, an execution stage of the respective task 222, a history of execution of the respective task 222 and/or one or more attributes relating to the execution of the respective task 222. For the certain streaming video example, the state information may indicate a most recent frame transmitted from the origin edge node 202B to the client device 204. For the certain game application example, the state information may include, for example, a difficulty level of the certain game, a current level of the game reached by the associated user 206, a current score, a history of achievements, a current count of remaining lives, an indication of currently available bonuses and/or prizes and/or the like.

However, in order to reduce the communication load and/or expedite transfer of execution, the task information does not include the entire task(s) 222 but rather only the state information indicating the state and/or the status of execution of one or more of the task(s) 222. Transferring only the state information may significantly reduce the volume of task information transferred from the origin edge node 202B to the destination edge node 202A and may therefore reduce the handshake time to significantly expedite the transfer of execution of the tasks(s) 222 from the origin edge node 202B to the destination edge node 202A.

While it is possible that one or more of the task(s) 222 are locally available to the edge controller 220A at the destination edge node 202A, for example, stored in the storage 214A, typically the task(s) 222 are not locally available at the destination edge node 202A. In such case, to support transmission of the task information comprising only the state information, the edge controller 220A may access one or more of the shared registry(s) 250 to obtain further information on the task(s) 222 identified by its task identifier. Specifically, the edge controller 220A may access the shared registry(s) 250 to identify one or more of the network resources 240 from which the task(s) 222 may be downloaded (obtained).

After identifying the respective network resource(s) 240, the edge controller 220A may download one or more of the task(s) 222 currently executed by the origin edge node 202B for the client device 204. For example, assuming a certain task 222 is the certain video stream streamed from the network 230 to the client device 204 via the origin edge node 202B, the edge controller 220A may communicate with the identified network resource(s) 240 and download the certain video stream or at least a relevant portion of the certain video stream identified by the state information received from the edge controller 220B for the certain video stream. In another example, assuming a certain task 222 is the certain game processed at least partially by the origin edge node 202B for the client device 204, the edge controller 220A may communicate with the identified network resource(s) 240 for downloading the certain game.

Optionally, the task information includes a client identifier of the client device 204 which may be used by the edge controller 220A to verify the identity and/or authenticity of the client device 204 and in particular to verify the association of the client device 204 with the task(s) 222. This may be highly effective to prevent another client devise 204 which may not be privileged (eligible) for using resources of the destination edge node 202A from taking advantage of the destination edge node 202A resources. The edge controller 220A may access, for example, the central controller(s) 260 and use the client identifier of the client device 204 to verify the identity of the client device 204 and its association with the task(s) 222.

As shown at 108, the edge controller 220A connects the client device 204 to the destination edge node 202A which may resume execution of the task(s) 222 previously executed by origin edge node 202B thus transferring execution of the task(s) 222 from the origin edge node 202B to the destination edge node 202A.

A shown at 110, the edge controller 220A may use the received task information to execute, control and/or initiate execution of one or more of the task(s) 222 after the client device 204 is connected to the destination edge node 202A.

Regardless of whether the task(s) 222 are transferred entirely from the origin edge node 202B to the destination edge node 202A and/or downloaded from the respective network resource(s) 240, the edge controller 220A may use the state information received from the edge controller 220B for each of the task(s) 222 to resume execution of the task(s) 222 at the destination edge node 202A. For example, assuming a certain task 222 is the certain video stream previously streamed from the network 230 to the client device 204 via the origin edge node 202B, the edge controller 220A may analyze the state information received from the edge controller 220B for the certain video stream to identify a last frame transmitted from the origin edge node 202B to the client device 204. The edge controller 220A may therefore resume streaming the certain video stream to the client device by transmitting video frames starting from the frame subsequent to the last frame transmitted from the origin edge node 202B. In another example, assuming a certain task 222 is the certain game processed at least partially by the origin edge node 202B for the client device 204, the edge controller 220A may use the state information to resume the game for the user 206 associated with the client device 204 from the point it was last processed by the origin edge node 202B. For example, the edge controller 220A may initiate the game from the level indicated by the state information, setup historic achievements and/or prizes as reported in the state information and/or the like.

Optionally, the connection of the client device 204 to one or more destination edge node 202A candidates is predicted in advance, i.e. before the client device 204 issues the computing services request to one or more of the destination edge node 202A candidates. Probability of a predicted connection between may be calculated by one or more connection predictors, for example, the central controller 260, the shared registry 250, a dedicated connection predictor network resource 240 and/or the like. For example, the connection predictor may identify a travel path (route) of the mobile client device 204 and based on the identified travel path, the connection predictor may predict a future path of the client device 204. Moreover, the connection predictor may further identify one or more edge nodes 202 along the predicted future path which may be potential candidates to serve as the destination edge node 202A for providing computing services to the client device 204 when the client device 204 enters their respective network coverage area.

For example, the connection predictor may identify a path of a mobile client device 204, for example, a path of a vehicle mounted with a vehicular client device 204, a path of a vehicle carrying one or more client devices 204 associated with one or more users 206 and/or the like. Based on the identified vehicle path, the connection predictor may predict one or more future paths of the vehicle and may further identify one or more potential candidate edge nodes 202 which are located along the predicted future path(s) and may therefore be potential candidates to serve as the destination edge node 202A when the vehicle enters and/or reaches their respective network coverage area. In another example, the connection predictor may identify a path of a mobile client device 204 associated with a user 206 travelling by foot (walking) in a geographical area, for example, a sports stadium, a shopping center, a public area and/or the like deployed with a plurality of Wi-Fi edge nodes 202. The connection predictor may predict a future path of the user 206 and may further identify one or more Wi-Fi edge nodes 202 located along the predicted future path and may hence be potential candidates to serve as the destination edge node 202A when the user 206 enters and/or reaches their respective network coverage area.

One or more of the candidate edge node(s) 202 predicted as potential candidates to serve as the destination edge node 202A may download and/or initiate one or more of the task(s) 222 currently executed by the origin edge node 202B for the client device 204. The task identifier(s) of the task(s) 222 may be provided to the predicted candidate edge node(s) 202, for example, by the connection predictor. In another example, the predicted candidate edge node(s) 202 may communicate with an edge node 202 currently providing computing services to the client device 204 to obtain the task identifier(s) of the task(s) 222. In such case the predicted candidate edge node(s) 202 may communicate with the currently serving edge node 202 using its edge identifier provided to the predicted candidate edge node(s) 202, for example, by the connection predictor. The candidate edge node(s) 202 may further use the task identifier(s) to access the shared registry(s) 250 and identify the tasks(s) 222 and optionally the network resource(s) 240 from which the task(s) 222 may be downloaded. Therefore, in case the client device 204 indeed enters the coverage area of one or more of the predicted candidate edge node(s) 202 and issues the computing services request, the task(s) 222 may already be at least partially available at the predicted candidate edge node(s) 202. As such, in case one of the predicted candidate edge node(s) 202 is selected as the destination edge node 202A for the providing the computing services, the task(s) 222 may be immediately executed by the selected predicted candidate edge node 202 using the task information, specifically the state information received from the origin edge node 202B. This may significantly reduce the handshake time and therefore expedite the transfer of the execution of the task(s) 222 from the origin edge node 202B to the destination edge node 202A.

Optionally, during and/or after the transfer of the execution of the task(s) 222, the edge controller 220A executed by the destination edge node 202A requests contractual information specifying one or more contractual terms relating to the client device 204, specifically to execution of the task(s) 222 for (on behalf) of the client device 204. For example, the edge controller 220A may communicate with the edge controller 220B to obtain at least some of the contractual information. In another example, the edge controller 220A may obtain at least some of the contractual information by communicating with one or more of the network resources 240 associated with one or more of the operators for storing such contractual information. Receiving the contractual term(s) from the origin edge node 202B, the destination edge node 202A may determine and/or verify whether the client device 204 is entitled for the computing services, at what cost, to what extent (i.e. amount of allocated resource(s)) and/or the like.

The contractual term(s) may indicate, for example, the amount of resources, for example, computing resources, storage resources, network resources and/or the like that may be assigned (allocated) at the destination edge node 202A for execution of the task(s) 222. In another example, the contractual term(s) may present one or more terms of a Service Level Agreement (SLA) associated with the client device 204, for example, Quality of Service (QoS), latency and/or the like. The destination edge node 202A may issue the contractual information request to the origin edge node 202B which is likely to have at least some of the contractual information in order to execute the task(s) 222 for the client device 204 according to the contractual term(s). Optionally, the destination edge node 202A issues the contractual information request to one or more of the network resources 240, for example, a network resource 240 associated with a service provider of the client device 204 and which may therefore have access to at least some of the contractual information relating to the client device 204.

Optionally, the edge controller 220A executed by the destination edge node 202A measures and records the resources allocated to execute the task(s) 222 for the client device 204 while the destination edge node 202A provides computing services to the client device 204. This may naturally apply to other edge nodes 202, for example, the origin edge node 202B which provides computing services to the client device 204 and executes the task(s) 222 for the client device 204. As such a portion of the execution of the task(s) 222 conducted by each of the edge nodes 202, for example, the origin edge node 202B and the destination edge node 202A, may be measured and recorded. Measuring and recording the resources allocated by one or more of the edge nodes 202 for the execution of the task(s) 222 may be of particular benefit for billing purposes for example. For example, the user 206 associated with the client 204 may be charged based on the portion of execution of the task(s) 222 measured by each edge node 202 and optionally according to the contractual terms and the SLA of the user 206. Moreover, the operator and/or owner of one or more of the edge nodes 202 may be rewarded (compensated) for example, by the service provider of the client device 204 based on the measured portion(s) of execution.

It is expected that during the life of a patent maturing from this application many relevant systems, methods and computer programs will be developed and the scope of the terms edge node and client device are intended to include all such new technologies a priori.

As used herein the term "about" refers to ±10%.

The terms "comprises", "comprising", "includes", "including", "having" and their conjugates mean "including but not limited to".

The term "consisting of" means "including and limited to".

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

What is claimed is:

1. A computer implemented method of transferring an execution of a task executed on behalf of a client device between edge nodes operated by different operators, comprising:

using at least one processor of a destination edge node of a plurality of edge nodes deployed at an edge of a network for:

receiving a request to provide computing services to at least one client device currently served by an origin edge node of the plurality of edge nodes, the origin edge node is operated by a first operator and the destination edge node is operated by a second operator;

receiving an edge identifier of the origin edge node and a task identifier of at least one task currently executed by the origin edge node for the at least one client device;

communicating with the origin edge node identified by the edge identifier to obtain task information relating to the at least one task identified by the task identifier in at least one registry shared by the first and second operators to map the task identifier to the at least one task;

connecting to the at least one client device; and executing the at least one task for the at least one client device using the obtained task information.

2. The method of claim 1, wherein the edge identifier is received from the at least one client device relaying the edge identifier from the origin edge node to the destination edge node.

3. The method of claim 2, further comprising the edge identifier includes a network address of the origin edge node, the network address is used to communicate with the origin edge node.

4. The method of claim 1, wherein the edge identifier is received from at least one central controller mapping real-time service of the origin edge node to the at least one client device.

5. The method of claim 1, wherein the destination edge node uses the edge identifier to obtain a network address of the origin edge node from the at least one shared registry mapping the edge identifier to the network address of the origin edge node, the network address is used to communicate with the origin edge node.

6. The method of claim 1, further comprising receiving an operator identifier of the first operator, the operator identifier is used to obtain a network address of the origin edge node from the at least one shared registry.

7. The method of claim 1, wherein the task information is applied to transfer all of the at least one task from the origin edge node to the destination edge node.

8. The method of claim 1, wherein the task information is applied to transfer state information of the at least one task from the origin edge node to the destination edge node, the state information is used to execute the at least one task obtained from at least one storage resource, the at least one storage resource is identified in the at least one shared registry according to the task identifier.

9. The method of claim 8, wherein the at least one storage resource is a member of a group consisting of: a local storage resource of the destination edge node and a remote network resource accessible over the network.

10. The method of claim 1, further comprising the at least one shared registry is accessible by at least one vendor of the at least one task.

11. The method of claim 1, wherein the task information further comprising a client identifier of the at least one client device used to correctly associate execution of the at least one task with the at least one client device.

12. The method of claim 1, further comprising providing an authentication certificate of the destination edge node to the origin edge which may validate the authentication certificate to verify the destination edge node is secure.

13. The method of claim 1, further comprising the at least one client device queries the destination edge node for resource availability of the destination edge node for execution of the at least one task before disconnecting from the origin edge node and connecting to the destination edge node, the resource availability comprising at least one of: availability of software program code required for executing the at least one task, computing resources availability, storage resources availability, network resources availability and computing services cost.

14. The method of claim 13, further comprising the at least one client device queries the destination edge node for a cost of at least one of resources of the destination edge node allocated for the execution of the at least one task before disconnecting from the origin edge node and connecting to the destination edge node.

15. The method of claim 13, further comprising, in case the at least one client device identifies a plurality of candidates for the destination edge node, the at least one client device queries at least one randomly selected candidate of the plurality of candidates for resource availability of the at least one randomly selected candidate and initiates connection to the at least one randomly selected candidate according to its resource availability.

16. The method of claim 13, further comprising, in case the at least one client device identifies a plurality of candidates for the destination edge node, the at least one client device queries each of the plurality of candidates for a respective resource availability and initiates connection to a preferred one of the plurality of candidates selected according to the respective resource availability.

17. The method of claim 1, further comprising predicting the connection of the at least one client device to the destination edge node prior to receiving the request and loading the at least one task for execution before the at least one client device connects to the destination edge node.

18. The method of claim 1, further comprising issuing a request to the origin edge node to indicate at least one contractual term relating to the execution of the at least one task.

19. The method of claim 1, further comprising measuring a portion of the execution of the at least one task conducted by the destination edge node.

20. A system for transferring an execution of a task executed on behalf of a client device between edge nodes operated by different operators, comprising:
   a storage storing a code; and
   at least one processor of a destination edge node of a plurality of edge nodes deployed at an edge of a network, the at least one processor is coupled to the storage for executing the stored code, the code comprising:
      code instructions to receive a request to provide computing services to at least one client device currently served by an origin edge node of the plurality of edge nodes, the origin edge node is operated by a first operator and the destination edge node is operated by a second operator;
      code instructions to receive an edge identifier of the origin edge node and a task identifier of at least one task currently executed by the origin edge node for the at least one client device;
      code instructions to communicate with the origin edge node identified by the edge identifier to obtain task information relating to the at least one task identified by the task identifier in at least one registry shared by the first and second operators to map the task identifier to the at least one task;
      code instructions to connect to the at least one client device; and
      code instructions to execute the at least one task for the at least one client device using the obtained task information.

* * * * *